United States Patent Office 3,382,036
Patented May 7, 1968

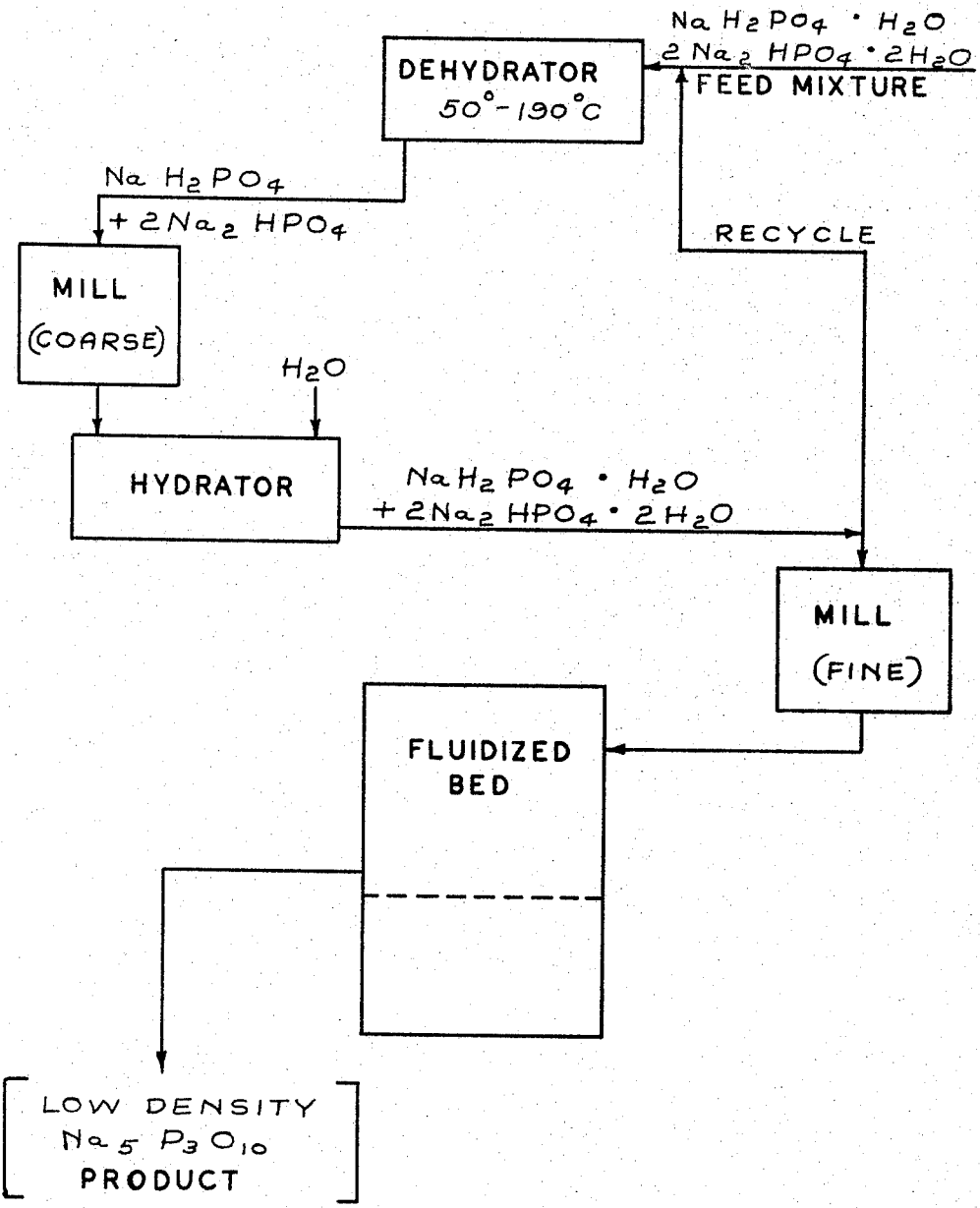

3,382,036
PROCESS FOR PRODUCING LOW-DENSITY SODIUM POLYPHOSPHATE
Leo B. Post, Chicago, Ill., George I. Klein, Larchmont, N.Y., and James N. Dyer, Hammond, Ind., assignors to Stauffer Chemical Company, New York, N.Y., a corporation of Delaware
Filed Aug. 23, 1963, Ser. No. 304,152
9 Claims. (Cl. 23—106)

This invention relates to a process for reducing the bulk density and increasing the porosity of sodium phosphates. In a preferred aspect, it relates to a process for producing low-density sodium polyphosphates in a fluidized bed from a feed mixture of sodium orthophosphates which has been conditioned to furnish a low bulk density product upon molecular or intermolecular dehydration.

Sodium phosphates, e.g., sodium tripolyphosphate, are today available commercially in a number of densities, each tailored to suit at least one particular domestic or industrial use. The so-called "light density" sodium tripolyphosphate which is commercially available (usually 25–40 lbs./cu. ft.) finds its major application as a detergent builder where a fast rate of solution is desired, or in certain types of detergent tablets. Medium-density (40–55 lbs./cu. ft.) and high-density (55–75 lbs./cu. ft.) sodium tripolyphosphates are also available, the former being the standard builder in packaged granular detergents and the latter finding its principal uses in low-foam detergents and detergent tablets. The density of any condensed sodium phosphate is normally fixed within limits by the process selected for molecular or intermolecular dehydration of the feed. For example, the lightest grades are often produced by flash-drying a liquid feed, e.g., in spray-drying equipment, while material having a medium-density is normally prepared by moderately fast heating of a dry feed mixture, i.e., in a dry feed, directly fired kiln. It has recently been found possible to produce sodium tripolyphosphate in varying bulk densities by controlled conversion of orthophosphate mixtures in a fluidized bed, see e.g., copending U.S. patent application Ser. No. 178,182, filed Mar. 7, 1962, which application is herewith incorporated herein by reference.

We have now discovered a method for reducing the bulk density of sodium phosphates using a conditioned orthphosphate feed which will be described hereinafter. The starting materials for the conditioned feed consist of crystalline monosodium phosphate, monohydrate

(NaH$_2$PO$_4$·H$_2$O)

or disodium phosphate, duohydrate (Na$_2$HPO$_4$·2H$_2$O) and mixtures thereof. The main steps in preparing the conditioned feed from the aforesaid starting materials consists of (1) heating the feed to drive off a substantial proportion of the hydrate water, (2) rehydrating the dehydrated feed with water to reconstitute a substantial proportion of the initial hydrates, and, when necessary, (3) milling the rehydrated feed until at least 70% thereof has an average particle diameter (APD) of 80 microns or less. After conditioning, the feed is preferably fed to a fluidized bed in the manner disclosed for a dry feed in the copending application mentioned supra.

Although the present process is not dependent upon theoretical considerations for operability, it is believed that dehydration and rehydration increase crystal porosity which aids in the formation of microscopic voids in the final product. Milling, on the other hand, is desirable to achieve proper agglomeration of the orthophosphate feed during conversion to any higher phosphates (polyphosphates). Multiple dehydrations and rehydrations of the feed may be accomplished where extremely low density and/or high porosity are desired in the product.

In a preferred process for producing sodium tripolyphosphate (hereinafter alternatively STPP), a mixture of hydrated sodium othophosphate salts (approximately two parts disodium for each one part monosodium—by weight) is first substantially dehydrated at a temperature between about 50° C. and 190° C., preferably between 90 C. and 165° C. At temperatures above 190° C., anhydrous monosodium phosphate and disodium phosphate are molecularly dehydrated to form, respectively, sodium acid pyrophosphate and tetrasodium pyrophosphate or intermolecularly dehydrated to form sodium tripolyphosphate, see e.g., Dombrovskii, N. M., Russian Journal of Inorganic Chemistry, January 1962, pp. 47–51. The formation of appreciable amounts of these condensed phopshates during preparation of the feed (e.g., over 10–20% by weight of total feed) is normally undesirable since they can prevent proper agglomeration of the feed in a later conversion step. The STPP feed mixture of hydrated orthophosphates will have a loss on ignition (LOI) of about 15–25% before dehydration. Dehydration at elevated temperatures is continued until the feed has a loss on ignition of approximately 5–10% by weight (herein referred to as substantially dehydrated STPP feed). The time required to reduce the LOI to 5–10% is mainly a function of temperature and the type of drying apparatus employed. Generally speaking, all types of drying apparatus, e.g., rotary driers, kiln mills, fluidized beds, drum driers, and spray-driers are suitable. In an indirectly heated rotary drier maintained at a feed inlet temperature of 25–50° C. and an outlet temperature of 120–160° C. the usual drying time (sojourn time) is about thirty minutes.

After dehydration, and preferably after being cooled and milled to pass about 30–60% through a 200 mesh screen, the STPP feed is rehydrated. Rehydration consists essentially of spraying, or otherwise applying, water on an agitated bed of the dehydrated phophate mixture. The amount of water added will be that necessary to raise the LOI of the STPP feed to between 12% and 25%, preferably between 14% and 18% by weight. Where water is added in excess of such amounts, the feed tends to become wet and difficult to mill without a loss of porosity. Such loss of porosity is due to liquification (melting) of the orthophosphates and recrystallization as a large crystal. Thus the addition of water must be critically controlled to avoid, not only excess total water (i.e. more than that required to reconstitute the initial hydrates), but localized areas of excess hydration where recrystallization may occur.

The type of apparatus which may be used in rehydrating the feed in a commercial process is varied, and virtually any unit which provides for mild agitation of a bed of solids is suitable, or can be adapted to the operation. A preferred apparatus consists of a horizontal trough containing an agitator which will transport the feed as well as provide throw-back action. Such apparatus will aid in the uniformity of hydration while providing continuous operation. To prevent condensation on the hydrator roof and walls, it is usually desirable to provide means for drawing fresh air across the agitated bed. It is preferable that the temperature of the mixture to the hydrator be maintained below about 50° C. When a higher temperature is used, the mixture may become tacky and difficult to handle during the later milling operation. For example, it has been demonstrated that a 9% LOI STPP feed at 50° C. can be hydrated to 16% LOI without becoming excessively tacky when later milled, while a practical limit of 13–14% LOI exists for STPP feed entering the hydrator at 85° C. Cooling of the feed before hydration, therefore, is advantageous where a high LOI, and, consequently, greater porosity is desired.

Where the desired end product is a condensed phosphate (and therefore the feed must be converted at elevated temperatures), e.g., STPP, the final conditioning step consists of milling the hydrated feed until at least 70% of the same has an APD of 80 microns or less. Rehydration tends to result in the formation of larger particles which normally will not agglomerate properly during high temperature conversion. On a commercial scale such milling may be carried out in a roll mill or any other type of mill which gives an equivalent degree of particle diminution.

The single drawing illustrates diagrammatically the flow sheet of the apparatus preferably employed in the production of STPP by our process.

Turning now to the drawing, it may be noted that the dehydrator is shown to remove all of the hydrate water from both the monosodium phosphate, monohydrate and disodium phosphate, duohydrate. As stated hereinbefore, it is sufficient that a large proportion of the hydrate water is removed and complete dehydration, as indicated, is not essential. Milling of the feed after dehydration and before rehydration is also not essential, although desirable in the preferred process. In this respect, a finely milled feed will tend to absorb water in the hydrator more quickly and to a greater extent than unmilled feed. Relatively coarse milling of the dehydrated feed will yield adequate results, but it is preferred to mill to pass at least about 30–60% through a 200 mesh screen.

From the "coarse" mill, the feed is passed into the hydrator where it is contacted with water. The rehydrated material leaving the hydrator may then be either recycled to the dehydrator or milled preparatory to feeding the fluidized bed. Rehydrated mixtures normally comprise a large proportion of monosodium phosphate, monohydrate and disodium phosphate, duohydrate, although partially rehydrated mixtures, that is, mixtures having an LOI of less than about 25% will provide satisfactory feed for low-density tripolyphosphates. A higher degree of rehydration is commensurate with a lower density product, and accordingly while the rehydrated mixture need not be recycled back to the dehydrator, recycle may be advantageous where a very low density product is desired.

Before the mixture leaving the hydrator can be fed to the fluidized bed for conversion, it must be passed into a "fine" mill where particle size is greatly reduced. After this last milling step the feed may be passed directly into the fluidized bed at a point either above or below the upper level of the bed. In the fluidized bed, which is maintained at a temperature between about 190° C. and 630° C. to effect conversion (i.e., molecular or intermolecular dehydration). Dombrovskii, ibid., page 48 et seq., the particles pass through a tacky state in which they adhere to (nucleus) particles in the bed, thus forming a porous agglomerate. Consequently, it is often desirable to distribute the feed over a large area of the fluidized bed surface and introduce recycled fines (for nucleating) close to the fresh feed entering the bed. The fines which may be recycled are those passing out of the bed with the product, as well as those recovered from off-gases from the fluidized bed in dust collecting apparatus. Where desirable, the fluidized bed converter may be replaced with other types of heating apparatus, e.g., rotary kilns of various types. The fluidized bed, however, is thought to be generally preferable to the other types of apparatus for the manufacture of low density STPP.

The following specific examples will further illustrate the process of the invention.

Example 1

On intimate mixture of monosodium phosphate, monohydrate and disodium phosphate, duohydrate was prepared as follows: A reaction mixture having an $Na_2O:P_2O_5$ ratio of approximately 1.67 was first formed by reacting soda ash and 87% $H_3PO_4$ in corresponding stoichiometric quantities. Sufficient water was removed from the reaction mixture by evaporation to result in a crystalline hydrate which, after evaporation of surface moisture, had approximately a 17% loss on ignition. The hydrated material, which consisted of a 1:2 ratio of monosodium and disodium orthophosphates, was dehydrated in a rotary drier at 100° C. to yield the corresponding anhydrous ortho salts having a 9% loss on ignition. The dehydrated mixture, which will hereinafter be referred to as feed A, was milled in a roll mill until approximately 15% of the particles remained on a 200 mesh screen. A portion of feed A was rehydrated with tap water at room temperature. The water was applied by spraying it on the mixture with agitation to provide uniform contact. Upon complete addition of the water, agitation was continued for approximately 30 minutes and a dry granular material with an LOI of 15% resulted. The granular rehydrated mixture was then milled in the same mill as feed A. This rehydrated and milled feed will hereinafter be referred to as feed B. Another portion of feed A was rehydrated according to the foregoing procedure to give a loss on ignition of 25%. This material was found to liquify somewhat upon milling and was dehydrated to reduce the loss on ignition from 25% to 20% before satisfactory milling could be accomplished in the same mill used for feed A. The feed mixture containing a 20% loss on ignition will hereinafter be referred to as feed C. Feeds A, B, and C were separately converted to sodium tripolyphosphate by continuously feeding each to a fluidized bed of sodium tripolyphosphate maintained at 450° C. The results are presented in the following table:

TABLE I.—EFFECT OF ADDING WATER TO ANHYDROUS ORTHOPHOSPHATE MIXTURES

| Feed | | Fluidized Bed | | Product, $Na_5P_3O_{10}$ |
|---|---|---|---|---|
| Designation | Percent LOI | Bed Temp., °C. | Retention Time, hrs. | Bulk Density, lbs./ft.$^3$ |
| A (Dehydrated) | 9 | 450 | 1–2 | 36.0 |
| B (Dehydrated, rehydrated) | 15 | 450 | 1–2 | 32.4 |
| C (Dehydrated, rehydrated) | 20 | 450 | 1–2 | 32.1 |

Example 2

Using the procedure described in Example 1, a monosodium phosphate, monohydrate-disodium phosphate, duohydrate mixture was prepared having a loss on ignition of 15%. This feed, which will hereinafter be designated feed D, was not dehydrated after crystallization, but was milled in a roll mill to pass 80% through a 200 mesh screen. A portion of feed D was then dehydrated in a rotary drier and milled to furnish a mixture having a 9% loss on ignition, which mixture will hereinafter be referred to as feed E. Another portion of feed E was rehydrated to a 17% LOI and milled in the same manner as described for feeds B and C in the preceding example. This rehydrated feed will hereinafter be referred to as feed F. Feeds D, E, and F were then converted to sodium tripolyphosphate by feeding the same continuously to a fluidized bed of sodium tripolyphosphate maintained at 450° C. The results are shown in Table II which follows:

TABLE II.—EFFECT OF DEHYDRATION AND REHYDRATION OF PHOSPHATE FEED MIXTURES

| Feed | | | Fluidized Bed | | Product, $Na_5P_3O_{10}$ Bulk Density, lbs./ft.$^3$ |
|---|---|---|---|---|---|
| Designation | Percent LOI | Sievings on 200 Mesh Screen, Percent | Bed Temp., °C. | Hrs. Retention Time | |
| D (Not dehydrated or rehydrated) | 15 | 20 | 450 | 1-2 | 38.4 |
| E (Dehydrated, not rehydrated) | 9 | 20 | 450 | 1-2 | 37.3 |
| F (Dehydrated, rehydrated) | 17 | 5 | 450 | 1-2 | 31.4 |

Example 3

A number of separate lots of dehydrated-rehydrated mono-disodium phosphate feed mixtures were prepared in accordance with the procedure described, supra in Example 1 (feeds B and C). These mixtures were milled in a roll mill to give varying degrees of particle size. The milled feed was then fed to a fluidized bed to produce sodium tripolyphosphate, and any effect of milling upon the bulk density of the final product was recorded. The results are presented in Table III.

The present process may be advantageously used to produce sodium phosphates having bulk densities below about 55 lbs./cu. ft. The preferred bulk density is between 25 and 35 lbs./cu. ft. From a practical standpoint, and in part due to particle frangibility, 20 lbs./cu. ft. appears to be about the lowest bulk density possible on a continuous commercial scale. The medium bulk density phosphates, e.g., those above about 40 lbs./cu. ft., may be useful in applications where it is necessary for the particles to absorb quantities of liquids, e.g., detergent mixtures, toothpastes, etc. Due to the greater porosity of the sodium phosphates produced from a dehydrated-rehydrated feed they tend to have greater capacity for absorbing and retaining liquids. Lower density sodium phosphates have an even greater porosity and capacity for holding such liquids, and consequently are highly preferable for use in detergent tablets and the like. As indicated hereinbefore, the porosity (bulk density) of the sodium phosphate produced by the process of the invention is controlled by the conditioning procedure used for the feed. Thus multiple dehydrations and rehydrations can be used to furnish the very low density materials while coarse milling before conversion can promote higher density. Obviously, milling of the product after conversion will also increase density.

The sodium phosphates which may be produced by the present process are those having $Na_2O:P_2O_5$ ratios between 1 and 2, including monosodium phosphate, sodium tripolyphosphate, and tetrasodium pyrophosphate. Further, any mixtures of two or more of the sodium phosphates, e.g., tetrasodium pyrophosphate and sodium tripolyphosphate, are within the scope of the invention. It should be noted that many of the commercially available condensed phosphates may include small amounts, up to about 10–15% by weight, of other phosphates. For instance, the usual commercial STPP will normally contain about 1–10% by weight of sodium metaphosphate, sodium pyrophosphate and sodium orthophosphates. Selection of the proper proportions of mono- and disodium orthophosphates to serve as feed to produce any of the sodium phosphates or mixtures thereof will be obvious to those skilled in the art since the product will have the same $Na_2O:P_2O_5$ ratio as the feed. For example, it will be obvious to use two moles of disodium orthophosphate (ratio=2.0) for every mole of tetrasodium pyrophosphate which is to be produced. Also, where a mixture of condensed phosphates is to be produced, a mixture of mono- and disodium orthophosphates having the same $Na_2O:P_2O_5$ ratio will provide the desired feed.

TABLE III.—EFFECT OF PARTICLE SIZE (MILLING) OF FEED ON PRODUCT DENSITY

| Feed | | | Fluidized Bed | | Product, $Na_5P_3O_{10}$ Bulk Density, lbs./ft.$^3$ |
|---|---|---|---|---|---|
| Designation | Percent LOI | Sievings on 200 Mesh Screen, percent | Bed Temp., °C. | Retention Time, hrs. | |
| G | 16.5 | 30-40 | 340 | 1.7 | 35.6 |
| H | 14.5 | 35 | 435 | 2.6 | 31.9 |
| I | 15.5 | 30 | 440 | 2.55 | 33.4 |
| J | 16.0 | 5 | 435 | 2.2 | 30.9 |
| K | 15.5 | 1 | 440 | 2.55 | 30.3 |

It is also important to note that sodium tripolyphosphate, which represents a preferred product of the present process, has two known crystalline modifications, the so-called high temperature form, commonly denoted Form I, and the low temperature form, commonly denoted Form II. Under atmospheric pressure, these polymorphic forms are reported to be enantiotropic with a transition temperature at 400–470° C. By the present process, each form, or mixtures thereof, may be produced.

The quantity of hydrate water expelled during dehydration will, of course, depend upon the quantity of water contained in the raw feed. It is necessary to remove at least about 25% of the total hydrate water to noticeably improve porosity and bulk density, while in the preferred process, 50–100% of the hydrate water is expelled. Some molecular water or water of constitution, usually not in excess of 25% by weight of that present, may also be driven off where dehydration is accomplished at high temperatures, i.e., near or above 190° C. Where it is stated herein and in the appended claims that a "substantial proportion" of the hydrate water is expelled, such statement is intended to mean that the percentage of water expelled is in accordance with this paragraph. On the other hand, the amount of water added to the dehydrated feed upon rehydration will be less than that which causes than 80 microns, rehydrating the resulting dehydrated feed may be thermally converted to condensed phosphates are the same as those used heretofore for the conversion of unconditioned feed (see, e.g., Dombrovskii, ibid.), and the selection of the same will be obvious to those skilled in the art.

The foregoing detailed description has been given for clearness of understanding only, and no unnecessary limitations should be understood therefrom, as modifications will be obvious to those skilled in the art.

We claim:
1. A process for producing low density sodium phosphates which comprises molecularly dehydrating a conditioned feed prepared by heating at least one crystalline compound selected from the group consisting of monosodium phosphate, monohydrate and disodium phosphate, duohydrate having an $Na_2O:P_2O_5$ ratio of from 1 to 2 inclusive at a temperature between 50° C. and 190° C. until a substantial proportion of the hydrate water is expelled, milling the dehydrated feed until at least 70% thereof has an average particle diameter of not greater than 80 microns, rehydrating the resulting dehydrated phosphate with water.

2. A process for producing a low-density sodium tripolyphosphate which comprises intermolecularly dehydrating at a temperature between 200° C. and 630° C. a conditioned feed, said conditioned feed being prepared by heating an intimate mixture of monosodium phosphate, monohydrate and disodium phosphate, duohydrate having an $Na_2O:P_2O_5$ ratio of about 1.67 at a temperature between about 50° C. and 190° C. until a substantial proportion of the hydrate water of the monosodium phosphate, monohydrate and disodium phosphate, duohydrate is expelled milling the dehydrated feed until at least 70% thereof has an average particle diameter of not greater than 80 microns, rehydrating the resulting mixture with water to a loss on ignition of between 12% and 25% by weight, and milling the rehydrated mixture.

3. A process for producing sodium tripolyphosphate having a bulk density between 25 lbs./cu. ft. and 35 lbs./cu. ft. which comprises intermolecularly dehydrating at a temperature between 200° C. and 630° C. a conditioned feed, said conditioned feed being prepared by heating an intimate mixture of monosodium phosphate, monohydrate and disodium phosphate, duohydrate having an $Na_2O:P_2O_5$ ratio of about 1.67 at a temperature between about 50° C. and 190° C. until said mixture has a loss on ignition of between 5% and 10% by weight milling the dehydrated feed until at least 70% thereof has an average particle diameter of not greater than 80 microns, rehydrating the resulting mixture with water to a loss on ignition of between 12% and 25% by weight, and milling the rehydrated mixture.

4. A process for producing sodium polyphosphate having a bulk density between 25 lbs./cu. ft. and 35 lbs./cu. ft. which comprises converting at a temperature between 200° C. and 630° C. a conditioned feed, said conditioned feed being prepared by heating an intimate mixture of monosodium phosphate, monohydrate and disodium phosphate, duohydrate having an $Na_2O:P_2O_5$ ratio of from 1 to 2 inclusive at a temperature between about 50° C. and 190° C. until said mixture has a loss on ignition of between 5% and 10% by weight, milling the dehydrated feed until at least 70% thereof has an average particle diameter of not greater than 80 microns, rehydrating the resulting mixture with water to a loss on ignition of between 12% and 25% by weight, and milling the rehydrated mixture.

5. A process for producing sodium tripolyphosphate having a bulk density between 25 lbs./cu. ft. and 35 lbs./cu. ft. which comprises intermolecularly dehydrating at a temperature between 200° C. and 630° C. a conditioned feed, said conditioned feed being prepared by heating an intimate mixture of monosodium phosphate, monohydrate and disodium phosphate, duohydrate having an $Na_2O:P_2O_5$ ratio of about 1.67 at a temperature between about 50° C. and 190° C. until said mixture has a loss on ignition of between 5% and 10% by weight milling the dehydrated feed until at least 70% thereof has an average particle diameter of not greater than 80 microns, rehydrating the resulting mixture with water to a loss on ignition of between 12% and 25% by weight, and milling the rehydrated mixture until at least 70% by weight of the particles contained therein have an average diameter of 80 microns or less.

6. A process for producing sodium tripolyphosphate having a bulk density between 25 lbs./cu. ft. and 35 lbs./cu. ft. which comprises intermolecularly dehydrating at a temperature between 200° C. and 630° C. a conditioned feed, said conditioned feed being prepared by heating an intimate mixture of monosodium phosphate, monohydrate and disodium phosphate, duohydrate, having an $Na_2O:P_2O_5$ ratio of 1.667 at a temperature between about 50° C. and 190° C. until said mixture has a loss on ignition of between 5% and 10% by weight milling the dehydrated feed until at least 70% thereof has an average particle diameter of not greater than 80 microns, rehydrating the resulting mixture with water to a loss on ignition of between 12% and 25% by weight, and milling the rehydrated mixture until at least 70% by weight of the particles contained therein have an average diameter of 80 microns or less.

7. A process for producing sodium tripolyphosphate having a bulk density between 25 lbs./cu. ft. and 35 lbs./cu. ft. which comprises continuously feeding a conditioned feed consisting essentially of a mixture of sodium orthophosphates to a dense fluidized bed of sodium tripolyphosphate maintained at a temperature between 200° C. and 630° C. while continuously withdrawing product from said fluidized bed at a substantially equivalent rate, said conditioned feed being prepared by heating an intimate mixture of monosodium phosphate, monohydrate and disodium phosphate, duohydrate having an $Na_2O:P_2O_5$ ratio of about 1.67 at a temperature between 50° C. and 190° C. until a substantial proportion of the hydrate water of the monosodium phosphate, monohydrate and disodium phosphate, duohydrate is expelled milling the dehydrated feed until at least 70% thereof has an average particle diameter of not greater than 80 microns, rehydrating the resulting mixture with water to a loss on ignition of between 12% and 25% by weight, and milling the rehydrated mixture.

8. A process for producing sodium tripolyphosphate having a bulk density between 25 lbs./cu. ft. and 35 lbs./cu. ft. which comprises continuously feeding a conditioned feed to a dense fluidized bed of sodium tripolyphosphate maintained at a temperature between 200° C. and 630° C. while continuously withdrawing product from said fluidized bed at a substantially equivalent rate, said conditioned feed being prepared by heating an intimate mixture of monosodium phosphate, monohydrate and disodium phosphate, duohydrate having an $$Na_2O:P_2O_5$$

ratio of about 1.67 at a temperature between about 50° C. and 190° C. until said mixture has a loss on ignition of between 5% and 10% by weight milling the dehydrated feed until at least 70% thereof has an average particle diameter of not greater than 80 microns, rehydrating the resulting mixture with water to a loss on ignition of between 12% and 25% by weight, and milling the rehydrated mixture.

9. A process for producing sodium tripolyphosphate having a bulk density between 25 lbs./cu. ft. and 35 lbs./cu. ft. which comprises continuously feeding a conditioned feed consisting essentially of a mixture of sodium orthophosphates to a dense fluidized bed of sodium tripolyphosphate maintained at a temperature between 200° C. and 630° C. while continuously withdrawing product from said fluidized bed at a substantially equivalent rate, said conditioned feed being prepared by heating an intimate mixture of monosodium phosphate, monohydrate and disodium phosphate, duohydrate, having an $Na_2O:P_2O_5$ ratio of 1.667 at a temperature between about 50° C. and 190° C. until said mixture has a loss on ignition of between 5% and 10% by weight milling the dehydrated feed until at least 70% thereof has an average particle diameter of not greater than 80 microns, rehydrating the resulting mixture with water to a loss on ignition of between 12% and 25% by weight, and milling the rehydrated mixture until at least 70% by weight of the particles contained therein have an average diameter of 80 microns or less.

References Cited

UNITED STATES PATENTS 3,210,154  10/1965  Klein et al. _____ 23—106
3,233,967  2/1966   Shen _____ 23—106

FOREIGN PATENTS 629,349  10/1961  Canada.

MILTON WEISSMAN, *Primary Examiner.*
OSCAR R. VERTIZ, *Examiner.*
L. A. MARSH, O. F. CRUTCHFIELD,
*Assistant Examiners.*